Oct. 7, 1969  M. W. KELLY  3,470,614
METHOD AND APPARATUS FOR MAKING DENTAL DIE
Filed Oct. 17, 1966  2 Sheets-Sheet 1

INVENTOR
MAURICE W. KELLY
BY
Owen, Wickersham & Erickson
ATTORNEYS

Oct. 7, 1969  M. W. KELLY  3,470,614
METHOD AND APPARATUS FOR MAKING DENTAL DIE
Filed Oct. 17, 1966  2 Sheets-Sheet 2

INVENTOR.
MAURICE W. KELLY
BY
Owen, Wickersham & Erickson
ATTORNEYS

United States Patent Office 3,470,614
Patented Oct. 7, 1969

3,470,614
METHOD AND APPARATUS FOR MAKING DENTAL DIE
Maurice W. Kelly, 257 Prospect Drive,
San Rafael, Calif. 94901
Filed Oct. 17, 1966, Ser. No. 587,214
Int. Cl. A61c *13/00*
U.S. Cl. 32—11                     5 Claims

ABSTRACT OF THE DISCLOSURE

A method for making a cast model of a human jaw having a removable and replaceable die segment comprising the steps of: anchoring a rigid dowel unit with a parting line plate in the opposite walls of a female impression of the patient's mouth above the area where the removable segment is to be located; pouring a flowable cementitious material into and filling said impression both above and beneath said dowel unit so that it will harden and cause the material beneath said dowel unit to be held thereto as an integral member and the material above said unit to be separable from the dowel unit; removing the master model and cutting it to define the removable die segment desired and removing the die segment from said master model having sides formed by said latter cutting step and by said dowel unit.

---

This invention relates generally to restorative dentistry, and more particularly to an improved method for making a model of a patient's teeth with a die portion or segment in the model which can be removed for use in constructing a dental appliance fulfilling the doctor's prescription. The invention also relates to a unique dowel pin unit for use in performing my method.

In the field of dentistry dental appliances such as jackets, crowns, inlays, onlays, bridges and combinations thereof are usually made by highly skilled technicians or appliance specialists using various indirect techniques. In order that such work can be done efficiently and accurately within a laboratory and without requiring the presence of the patient, it is necessary to provide some way for reproducing the patient's oral cavity of his upper or lower jaw containing the tooth or teeth for which the appliance is being made. The fundamental problem with this procedure is to form an accurate master model of the patient's upper or lower jaw from which a segment including the tooth or teeth being fitted for an appliance can be readily removed and replaced.

Prior to the present invention a method called the Thompson technique was used for providing such a master model having a removable and replaceable segment for which the dental appliance was to be made. In this method, in order to accomplish the removal of the segment for making the appliance, two separate pourings of dental die stone in a female index or impression of the patient's teeth had to be made with a separating material provided between them. In addition to being more time consuming and thus more expensive, the prior art technique often produced undesirable results because it failed to overcome the difficulty of initially freeing and separating the segment from the master model after the latter was hardened and removed from the impression.

In general, an object of the present invention is to provide a method for making a dental master model with a removable segment that is an improvement over prior techniques including the Thompson method, and more particularly a method that facilitates the making of models in much less time and with more consistently favorable results, and which can be performed by persons with a lesser degree of skill than heretofore required by other methods.

Another object of my invention is to provide a method for producing a dental model having a removable segment or die that can be initially removed from and then replaced in the model in the same position quickly and easily and for a large number of times, as is required when an appliance is being made and fitted within extremely close tolerances.

Still another object of the present invention is to provide a method for making a dental model with a removable die portion in which only a single pour of dental stone is required. This is an important feature because it not only eliminates the need for two dental stone materials with different characteristics but it also eliminates any locking that may occur due to an undercut contour between two materials poured one on top of the other in the same impression.

The aforesaid and other objects of my invention are accomplished by a method which entails the use of a dowel pin unit which is secured to the buccal and lingual walls of the impression cavity before the single pour of dental stone is made therein to form a model. This unit includes both a dowel pin and a parting line plate in combination therewith, which becomes an integral part of the die or segment that is removable from and replaceable in the master model. Another advantage of my method is that it eliminates any cleavage points or fracture lines in the stone which heretofore occurred in prior methods in relieving the die from the model.

It is thus another object of the present invention to provide a dowel pin unit for use in constructing a dental model having a removable and replaceable die portion and more specifically it is an object to provide a dowel pin unit that:

(1) Can be readily adjusted or made to the size necessary to fit between the walls of dental impressions of varying shapes and sizes, and to provide removable dies of different sizes;

(2) Becomes an integral part of the die segment which is removed from the master model; and (3) Can be originally formed and then easily positioned within the dental impression so as to compensate for oral arch and curvature.

Another object of the invention is to provide a dowel unit for making a removable dental die model that includes a parting line plate and a dowel pin in combination and facilitates the removal and replacement of the die model for one or more model teeth from a larger master model of a dental patient's oral cavity.

Other objects, advantages and features of the invention will become apparent from the following detailed description thereof taken in conjunction with the accompanying drawings, in which.

Figure 1:
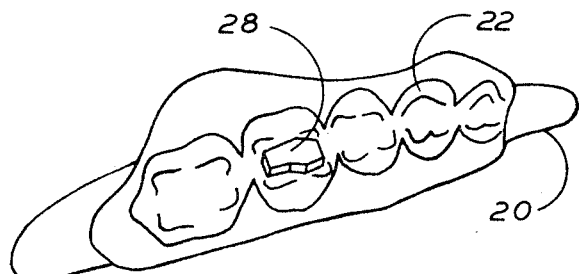
FIGS. 1–8 are a series of views in either perspective or in elevation and in section showing the method steps according to the principles of my invention.

Referring to FIGS. 1–8 which illustrate the steps of my improved method for making a model with a segment or tooth die therein that is easily removable from and replaceable in the model, FIG. 1 shows an impression or a female index 20 which is made in the usual manner with a hydrocolloid, rubber or similar flexible material. When allowed to set after being formed in the patient's mouth, this impression provides a cavity 22 that accurately represents all of the contours and crevices of that portion of the patient's mouth including the tooth or teeth to be fitted with some appliance such as a crown or an inlay. For every person a dental impression is of course different, but essentially it always comprises a curved cavity 22 with irregular walls that are higher than the patient's teeth below the gum line. The wall 24, the surface next to the cheek of the patient's teeth, is termed buccal, and the opposite wall 26 toward the tongue is called lingual. A protuberance 28, as shown in the bottom of the impression 20, is representative of a portion of a tooth in the patient's jaw that has been removed by the dentist and for which an appliance is to be made.

Figures 9, 10, 11:
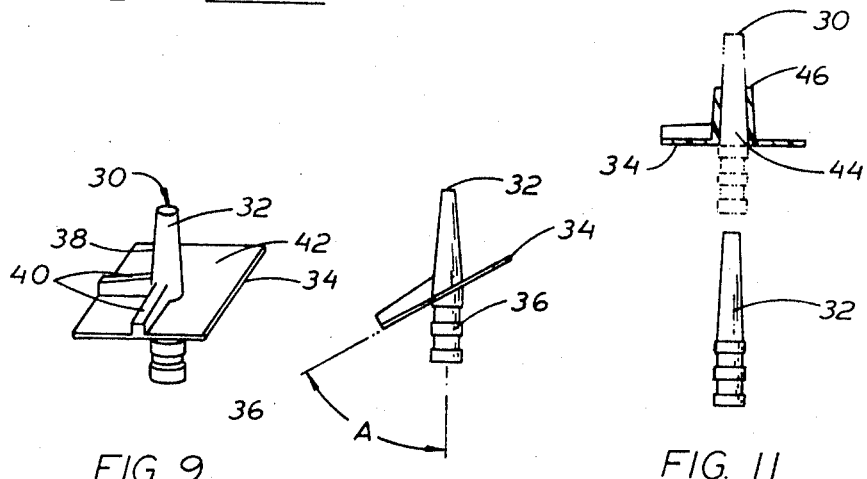
FIG. 9 is a view in perspective showing a dowel unit embodying the principles of the invention.
FIG. 10 is a view in elevation and in section showing the dowel unit of FIG. 9.
FIG. 11 is an exploded view showing another dowel unit according to my invention.

In the next step of my method, I provide a unique dowel unit 30 which has previously been formed and is ready for use. This unit, as shown in FIGS. 9–11, includes a dowel pin 32 fixed transversely in and extending through an attached parting line plate 34. Each dowel pin of a unit 30 has a serrated, grooved or irregularly shaped portion 36 at one end and a tapered, smooth-surfaced portion 38 at the other end. The pin and the plate can be made as a single integral unit or they can be made as separate components and joined together by some suitable means.

In FIG. 9, the pin 32 and the parting plate 34 are formed as an integral unit from a durable, moldable material such as a suitable plastic or metal. The pin 32 usually is oriented substantially perpendicular to the plate but, as shown in FIG. 10, it may in some units be set at an angle (indicated by the symbol A) of less than 90° thereto to compensate for oral arch and curvature of the impression cavity. The plate 34 is generally square or rectangular in shape and is preferably transparent so that the area under it can be seen when stone mortar is poured into the impression. It is also provided with a keying portion 40 which may be any protuberant bar, bars or a buttonlike protuberance on its otherwise planar surface 42 from which the smooth tapered pin end portion 38 extends. However, in lieu of the keying portion 40, I may provide a radially extending key portion on the pin itself and more specifically on its smooth pin end portion 38. The keying portion on either the plate surface 42 or on the pin as just described serves to register or position a segment or die of a model when it is repeatedly replaced in the model.

Another dowel unit 30a according to my invention, as shown in FIG. 11, includes a parting plate 34a having a central opening 44 surrounded by an integral tapered sleeve portion 46. Fitted within the opening and secured by the sleeve portion is a pin 32a having a serrated end portion 36a and a smoothly tapered longer end portion 38a, as previously described. A key portion 40a may be provided, as shown on the surface of the plate or on the pin itself to provide a registering means for a die that includes the dowel pin unit. In this arrangement the plate 34a is preferably molded from a clear, rigid plastic material, and the pin 32a is formed of metal, as with dental dowel pins that are commercially available.

While the dowel units shown in FIGS. 9–11 have only one pin, it should be understood that other dowel units according to my invention could also be made with two or even more pins for a single parting line plate, where extra large dies are required to be separable from a stone model.

Figure 2:
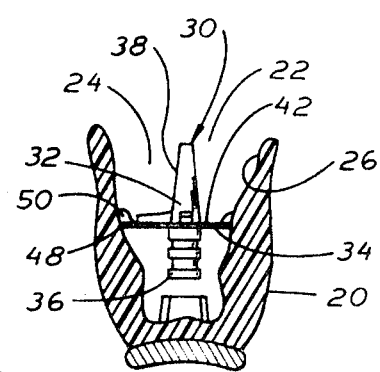

As shown in FIG. 2, the next step of my method is to locate the dowel unit 30 in the cavity 22 of the impression 20 and fix it to the buccal and lingual walls 24 and 26 of the impression directly over the portion that is meant to be removable as a separable die from the master model and includes the protuberance 28 in the impression which represents the appliance to be made eventually. The pin unit is oriented so that its serrated end 36 is substantially centered and extends well within the space of the impression where the removable die portion of the model is desired to be located. However, the pin is suspended well above the bottom of the cavity so that it does not engage and distort the impression and will be completely embedded in the model. The side edges 48 of the parting line plate 34 may be shaved down slightly or shaped if necessary to enable the dowel unit 30 to fit in the impression with its pin and plate portions properly oriented. This is easily done if the plate is made of a relatively soft material such as plastic. With the dowel unit properly positioned, its side edges 48 are now fixed to the opposite walls of the impression cavity by wax or some other suitable cement or adhesive indicated by the numeral 50.

Figure 3:
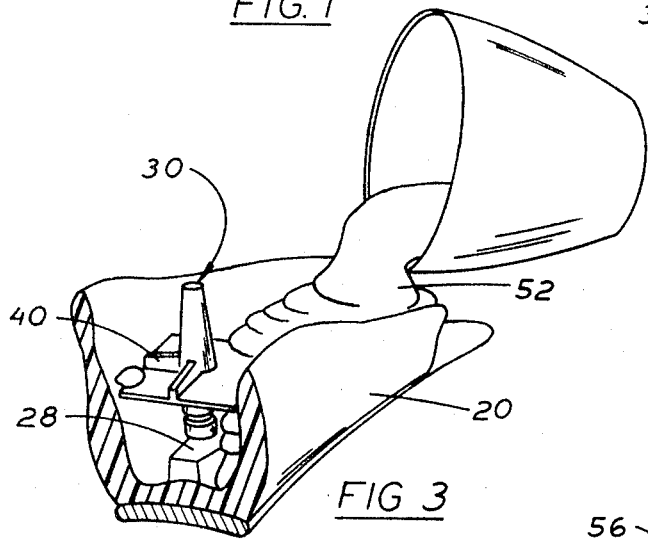
Figure 4:
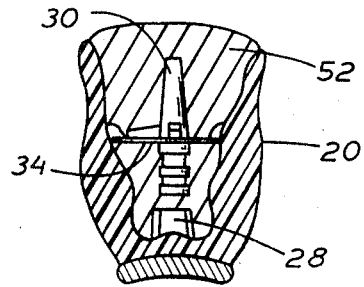

After the dowel pin unit has been secured in place the next step of my method is to pour into the impression cavity 22 a well-spatulated mixture of dental die stone 52 (FIG. 3). This material is worked thoroughly into the mold cavity so that all crevices are filled, particularly within the impression cavity beneath, around and above the dowel unit 30. During this filling step the parting line plate 34 of the dowel unit serves to confine the stone material that flows and is worked into the cavity beneath it, and this confinement helps to remove any voids or air bubbles which heretofore sometimes tended to form during such pouring operations and detracted from the quality of the model. Enough dental die stone is provided so that it more than fills the impression cavity, and the dowel unit including the smooth, upright end portion 38 is completely covered when this step is completed (see FIG. 4). The stone 52 is now allowed to set or harden in accordance with the manufacture's specifications.

Figure 5:
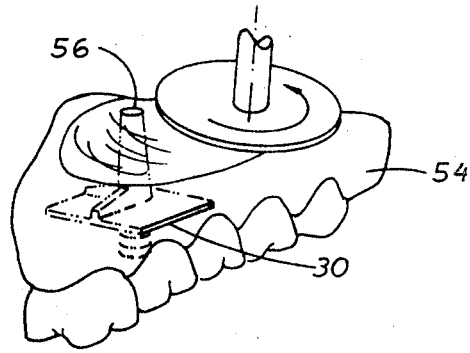
Figure 6:
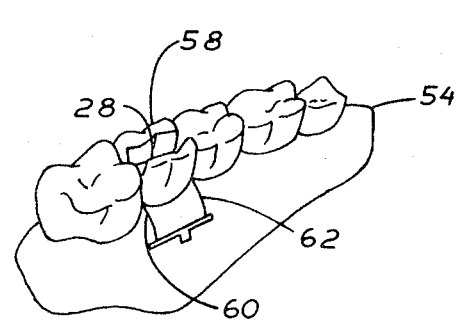

After the dental die stone 52 within the impression has fully hardened, it becomes a stone replica or model 54 of the patient's tooth structure and is then removed from the impression 20. If the cast or model of hardened dental stone is free from flaws and therefore acceptable, it is trimmed of excess stone on a dental model trimmer. During this step, as illustrated in FIG. 5, grinding is performed on the bottom of the cast or model 54 to locate the end 56 of the smooth, tapered portion 38 of the dowel pin 32. The master model 54 includes a precise replica of the patient's tooth 58 for which an appliance such as an inlay is to be made, a cavity 28a having been formed therein by the impression protuberance 28. On the opposite sides of the model in the portion thereof representing the gum below the tooth portion 58, the side edges 48 of the parting line plate 34 appear and are flush with the model surface.

In the final step of my method, mesial and distal saw cuts 60 and 62 are made on the model 54 which are at opposite ends of the area including the tooth portion 58. Each cut is made to a depth that is either just to the top (or occlusal) side of the parting line plate 34 of the embedded dowel unit 30 or completely through the parting line plate at its opposite end. These cuts will, of course, vary in depth and location according to the variations in dowel units and the size and shape of the impression cavity. After the cuts have been made in the model 54, any relief that is necessary is made around its bottom surface at the exposed end of the dowel pin.

Figure 8:
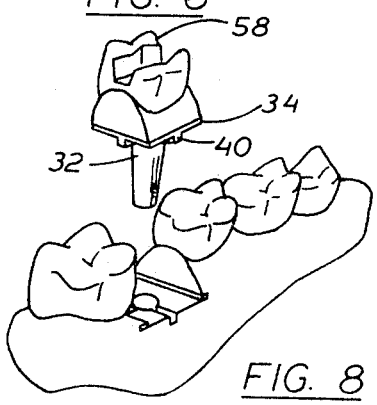
Figure 7:
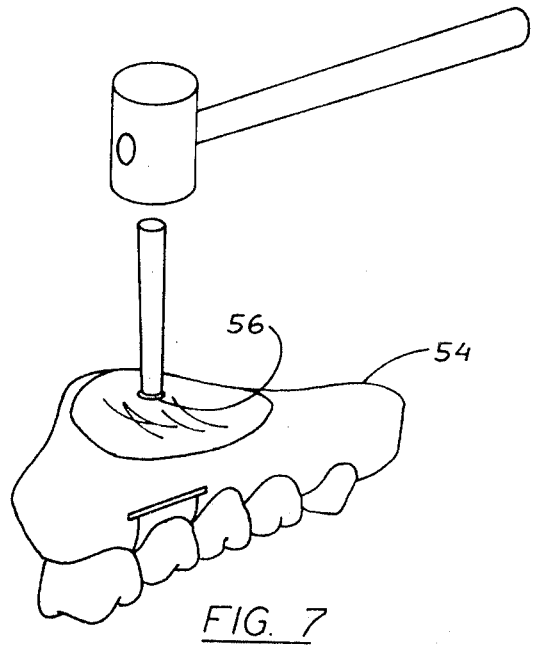

The pin 32 can now be tapped lightly to release from the cast model 54 the tooth portion in the form of a replaceable segment or die 58 containing the dowel unit 30. (See FIG. 7.) The dental die stone surrounding the serrated portion 36 of the pin in the die 58 forms a locking grip on the dowel pin unit 30, but the smooth tapered pin 38 on the opposite side of parting plate 34, once tapped loose, slides easily out of a hole formed in the main model or cast (FIG. 8). The protruding or keying portion 40 on the dowel unit forms a mating depression in the dental stone when it is cast. This provides a register means for the separable die 58 so that it can always be replaced in the main model in exactly its normal position.

From the foregoing it should be apparent that the present invention provides a method for making dental dies that reduces the time, complexity, expense and uncertainty of results associated with prior art methods. More-over, it provides a process that is applicable to a wide range of applications in the field of dental prosthetics.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for making a cast model of a dental patient's oral jaw with a removable and replaceable die segment thereof comprising the steps of:

making a female impression from an initially formable material which is allowed to become rigid after the oral jaw impression is taken, said impression having a cavity with buccal and lingual walls;

providing a dowel unit comprised of a combined parting line plate and dowel pin extending transversely therethrough;

locating and centering the dowel unit over the area of the impression intended to have a removable segment;

securing the plate of the dowel unit to the buccal and lingual walls so that one end of the dowel unit extends downwardly between the buccal and lingual wall but not touching the impression;

pouring a well-spatulated mixture of dental stone material within the cavity of said impression, said material filling beneath and also covering the plate of said dowel pin unit;

allowing said dental stone to harden to form a model and removing said model from said impression;

trimming excess stone material from said model and grinding the bottom thereof to expose the end of said dowel pin;

providing saw cuts on said model from the top side down to form opposite sides of the removable segment, said saw cuts engaging or passing through the upper surface of the parting line plate;

and applying an axial force to the exposed end of said dowel pin to remove a segment from said model whose sides are formed by said saw cuts and whose bottom is said dowel unit plate.

2. A method for making a cast model of a dental patient's oral jaw with a removable and replaceable die segment thereof comprising the steps of:

making a female impression from an initially formable material which is allowed to become rigid after the oral jaw impression is taken, said impression having a cavity with buccal and lingual walls;

providing a dowel unit comprised of a combined parting plate and dowel pin extending transversely therethrough;

locating and centering the dowel unit over the area of the impression at which it is desired to have a removable segment;

securing the plate of the dowel unit to be buccal and lingual walls so that the pin of the dowel unit extends downwardly between the buccal and lingual walls but not touching the impression;

pouring a cementitious material within the cavity of said impression, said material filling beneath and also covering the plate of said dowel pin unit;

allowing said material to harden to form a model and removing said model from said impression;

providing a pair of slots extending partially through said model from the top side down to form opposite sides of the removable segment, said slots engaging or passing through the upper surface of the parting plate closely adjacent to its ends;

and removing a segment from said model whose sides are formed by said slots and whose bottom is said dowel unit parting plate.

3. A method for making a cast model of a dental patient's oral jaw with a removable and replaceable die segment thereof comprising the step of:

making a female impression of the dental patient's oral cavity;

anchoring a rigid dowel unit in the opposite buccal and lingual walls of the impression above the area thereof that the removable segment is to be located;

pouring a flowable cementitious material into and filling said impression both above and beneath said dowel unit;

allowing the poured material to harden and causing the material beneath said dowel unit to be held thereto as an integral member and the material above said unit to be separable from the dowel unit;

removing the master model from the impression;

cutting said master model partially transversely from its top down at two spaced apart locations defining the removable die segment desired;

and removing the die segment from said master model having sides formed by said latter cutting step and by said dowel unit.

4. For use in making a removable die in a dental model, a dowel unit comprising in combination:

a rigid parting line plate having opposite surfaces, at least one of which is smooth, and a pair of opposite edges that are substantially parallel;

a pin extending transversely through and fixed in said plate, said pin having a portion at one end extending from one of said planar surfaces and including means for locking the unit within hardened cementitious material, a smooth tapered portion at the other end of said pin extending from the opposite planar surface of said parting line plate and a relatively short protuberance on an otherwise smooth planar surface from which the tapered pin portion extends, said protuberance providing a means to register said removable die in its proper position when it is replaced in a master dental model.

5. For use in making a removable die in a dental model, a dowel unit comprising in combination:

a rigid parting line plate having opposite surfaces, at least one of which is smooth, a pair of opposite edges that are substantially parallel and an integral annular collar surrounding an opening in the plate;

a pin extending transversely through said opening in said plate and retained by said collar, said pin having a portion at one end extending from one of said planar surfaces and including means for locking the unit within hardened cementitious material, a smooth tapered portion at the other end of said pin extending from the opposite planar surface of said parting line plate; and a protruding bar member on the otherwise planar surface of said parting line plate from which the smooth tapered end of said pin extends.

References Cited

UNITED STATES PATENTS 2,337,036  12/1943  Erdle _____ 32—11 XR
3,226,827  1/1966  Spalten _____ 32—11

ROBERT PESHOCK, Primary Examiner